United States Patent [19]

Gordon

[11] Patent Number: 4,548,878

[45] Date of Patent: Oct. 22, 1985

[54] ELECTROCHEMICAL CELL AND METHOD OF PASSIVATING SAME

[75] Inventor: Arnold Z. Gordon, Lyndhurst, Ohio

[73] Assignee: Gould Inc., Rolling Meadows, Ill.

[21] Appl. No.: 710,607

[22] Filed: Mar. 11, 1985

[51] Int. Cl.[4] .................... H01M 2/32; H01M 6/50
[52] U.S. Cl. .................................. 429/50; 429/70; 429/113; 429/198; 429/101
[58] Field of Search ............... 429/50, 51, 52, 61, 429/62, 63, 195, 113, 13, 14, 101, 48, 49, 198, 27, 57, 95, 70

[56] References Cited

U.S. PATENT DOCUMENTS

| | | | |
|---|---|---|---|
| 3,791,871 | 2/1974 | Rowley | 429/118 |
| 3,976,509 | 8/1976 | Tsai et al. | 429/194 |
| 4,007,057 | 2/1977 | Littauer et al. | 429/57 |
| 4,075,400 | 2/1978 | Fritts | 429/62 |
| 4,351,888 | 9/1982 | Dampler et al. | 429/101 |

FOREIGN PATENT DOCUMENTS 0077831  7/1976  Japan .................. 429/101

OTHER PUBLICATIONS

Kemp et al., Design and Performance Features of a 0.45 kWh Lithium-Water Marine Battery, 11the IECEC, Uev., USA (Sep. 12-17, 1976), pp. 462-466.

*Primary Examiner*—Donald L. Walton
*Attorney, Agent, or Firm*—Wood, Dalton, Phillips, Mason & Rowe

[57] ABSTRACT

Selected saturated organic polymers having multiple ether linkages are useful in at least partially passivating the electrochemical reaction occurring at the reactive metal anode of an electrochemical cell using an aqueous electrolyte.

Useful polymers are characterized as having a molecular weight in the range of about 100 to 1000 Daltons, as being at least partially miscible with the aqueous electrolyte, chemically inert with respect to the anode, cathode and electrolyte, and having an atomic ratio of carbon in the polymer to oxygen in the ether linkages of about 1 to 5:1.

24 Claims, No Drawings

ELECTROCHEMICAL CELL AND METHOD OF PASSIVATING SAME

BACKGROUND OF THE INVENTION

1. Field of the Invention

This invention relates generally to electrochemical cells utilizing a reactive metal anode and, more particularly, this invention relates to an electrochemical cell utilizing an alkali metal anode and to means for safely passivating such a cell.

2. Description of the Prior Art

Electrochemical cells utilizing a reactive metal anode (typically of an alkali metal such as lithium, for example), a cathode spaced from the anode to define a reaction space, and an aqueous alkaline electrolyte are well known. Many such cells utilize a silver oxide cathode, or a gas consuming cathode, such as an air cathode.

Such cells are described in detail in numerous patents and publications, including U.S. Pat. Nos. 3,791,871 (Rowley), 3,976,509 (Tsai et al), and 4,007,057 (Littauer et al), the respective disclosures of which are incorporated herein by reference.

Such cells are intrinsicly energetic, and therefore potentially explosive. Many prior attempts have been made to provide practical means for controlling the energy characteristics of such cells. One important objective of such research has been to provide means for safely and reliably shutting down or controllably passivating an operating electrochemical cell of this type.

Electrochemical cells of the reactive metal type generally utilize an aqueous alkaline electrolyte with which both the cathode and the anode are in contact during operation. Typically, the cathode and anode are at least partially immersed in the electrolyte during operation. In a typical lithium cell, the electrolyte comprises a solution of lithium hydroxide in water, which may be seawater. Often, the lithium hydroxide concentration in the electrolyte is controlled by circulating makeup water and electrolyte through a loop which includes the cell reaction spaces defined between cathode and anode pairs.

Prior attempts to shut down or control the electrochemical reaction rate have utilized ethylene glycol (a primary diol) as a shutdown fluid. However, ethylene glycol has a tendency to rapidly and violently react with the lithium anode or silver oxide cathode, which may cause an explosion.

SUMMARY OF THE INVENTION

The present invention is directed to overcoming one or more of the problems described above.

According to the present invention, a safe, reliable liquid useful in shutting down or partially passivating a reactive metal/aqueous electrolyte electrochemical cell is provided. The invention further contemplates an electrochemical cell comprising a supply of the shutdown liquid of the invention, and a method of shutting down or controlling the rate of reaction of such a cell.

The shutdown liquid of the invention comprises an ethylenically saturated organic polymer having a molecular weight of about 100 to 1,000 Daltons and which is at least partially miscible with the aqueous electrolyte. The polymer contains a plurality of ether linkages, with an atomic ratio of carbon present in the polymer to the oxygen in the ether linkages in the range of about 1 to 5:1. The selected polymer is substantially chemically inert with respect to the anode, cathode and aqueous electrolyte of the cell.

Typical shutdown liquids of the invention include tertiary alcohols, and linear, branched or cyclic polyethers, for example.

Further objects and advantages of the invention will be apparent to those skilled in the art from a review of the following detailed description taken in conjunction with the appended claims.

DETAILED DESCRIPTION OF THE INVENTION

According to the invention, control of the rate of production of electrical energy in an electrochemical cell having a reactive metal anode and a cathode spaced therefrom and utilizing an aqueous alkaline electrolyte is effected by at least partial displacement of the electrolyte by a shutdown liquid which effectively passivates, or partially passivates, the electrochemical reaction occurring at the anode and/or cathode faces.

Reactive metal cells are well known, and generally utilize an alkali metal, such as lithium, for example, in the anode. The metal may be present in elemental, compound, complex or alloy form.

In such cells, a cathode is spaced from the anode to define a reaction space in the cell. In many cases, the cathode is in mechanical contact with an electrically insulating film formed on the surface of the anode. In the case of lithium anodes, the film principally comprises lithium hydroxide (LiOH), which forms upon contact of the anode with a source of moisture.

Any of various types of cathodes may be utilized, but silver oxide (AgO) cathodes and gas consuming cathodes, such as air cathodes, are preferred.

The invention utilizes an aqueous alkaline electrolyte such as, for example, an aqueous solution of lithium hydroxide.

The function of the shutdown liquid is to passivate, or partially passivate, the anode and/or the cathode by contact therewith. In most cases, the shutdown liquid is added to the electrolyte which circulates through a loop which includes the cell reaction space.

To be useful, a shutdown liquid should preferably possess the following characteristics:

(a) a melting point below the minimum temperature encountered during operation (e.g., less than about $-15°$ C.);

(b) a sufficiently low viscosity over the operating temperature range to assure flowability;

(c) a boiling point higher than the boiling point of the electrolyte under the conditions of operation (e.g., greater than about 125° C., as the pressure of operation may vary depending upon weight constraints and exterior pressure; exterior pressure may reach 2000 psi at the ocean floor, and the electrolyte may, in practice, be pressurized up to about 300 atm.)

(d) a sufficiently low volatility to avoid over-pressurization of the cell and excessive venting losses;

(e) significant fluid miscibility with the electrolyte;

(f) little or no thermal or electrochemical reaction with the anode;

(g) little or no thermal or electrochemical reaction with the cathode;

(h) non-corrosiveness with respect to system hardware;

(i) a low order of toxicity; and, (j) a shelf-life of at least five years.

The liquid shutdown material of the invention is sufficiently polar to be miscible with the electrolyte. However, simultaneously, the reactivity of the polar portions of the molecule is of a sufficiently low order as to render the molecule substantially non-reactive with the anode, cathode or electrolyte. Although these requirements of low reactivity and high miscibility tend in general to be mutually exclusive, it has been found that use of a liquid, ethylenically saturated organic polymer having multiple ether linkages (either in the polymer backbone or in pendant groups) and a molecular weight of about 100 to 1,000 Daltons accomplishes the objectives of the invention. The polymer is further characterized in that the atomic ratio of carbon present in the polymer to the oxygen present in the ether linkages is in the range of about 1 to 5:1.

Preferred types of materials satisfying the foregoing definition include tertiary alcohols, branched or cyclic polyethers and, more preferably, linear polyethers. Selection of materials by molecular weight can be made to satisfy the physical requirements of the invention.

Highly preferred species of the invention include low molecular weight methoxylated polyethylene glycols.

It is highly preferred that the organic polymer used as the shutdown liquid be completely miscible with the aqueous alkaline electrolyte, and that the mixture of electrolyte and shutdown fluid define a single liquid phase in the cell reaction space.

However, it is permissible to have a two phase system comprising an organic-rich phase and a water-rich phase as long as the water-rich phase contains a significant proportion of dissolved polymer. It has been found that a water-rich phase comprising at least 5 wt. %, and preferably 20 wt. %, of the shutdown polymer is effective in passivating the electrochemical reaction.

Therefore, according to the invention, sufficient liquid polymer should be provided to define at least one phase in the cell reaction space, each of which comprises at least 5 wt. % of dissolved liquid polymer.

In operation, at least about one-third of the aqueous electrolyte should be displaced by the shutdown liquid. It is preferred, however, that at least two-thirds of the electrolyte be displaced. For ease of use, the supply of shutdown liquid should comprise at least about 25 wt. % polymer, which may be dissolved in water or in a water-miscible organic solvent.

It is permissible that the liquid phase contain suspended or dissolved ionic solids which may otherwise be present in such a cell. It should be noted that the water miscibility of the organic polymer generally increases with a decrease in the concentration of such solids. It may be convenient to use relatively low molecular weight organic polymers in systems having high contents of suspended or dissolved solids.

Since the electrochemical reaction rate of reactive metal anodes varies directly with increases or decreases in temperature, and since such anodes exhibit negligible reactivities below particular minimum temperatures designated as "activation" temperatures, the effectiveness of the shutdown liquid may be enhanced by storing the liquid at a depressed temperature (relative to that of the electrolyte), preferably at a temperature below the activation temperature of the anode, such as at a temperature of 0° C. or below.

A variety of liquid organic polymers satisfying the definition set forth above and exhibiting the required physical characteristics have been screened, and various suitable materials are identified below in conjunction with the Examples. Methoxylated polyethylene glycol having a molecular weight of 350 Daltons is the preferred material, but methoxyl polyethylene glycols or mixtures thereof having a molecular weight (or, if a mixture, an average molecular weight) in the range of about 350 to 550 Daltons are quite suitable. Such materials are commercially available under the "Carbowax" trademark from Union Carbide Corporation. Other suitable materials include polyethylene glycol, preferably having a molecular weight of about 200 Daltons, polypropylene glycol, preferably having a molecular weight of about 400–500 Daltons, propylene glycol, diglyme(2-methoxy ethyl ether), and 2-(2-methoxyethoxy) ethanol.

EXAMPLES

The following specific Example provide an illustration of the utility of various materials in accomplishing the objectives of the invention. The Examples, however, should not be construed as limiting the scope of the invention.

The following Examples illustrate the screening techniques which are suitable in selecting an appropriate shutdown liquid.

Example 1—Silver Oxide Cathode Open Current Voltage Test

A three-quarter inch diameter disc of nickel backed silver oxide was coated with a thin film of a selected test fluid and placed, nickel side down, on a hotplate. A thermocouple was mounted such that it was in contact with the silver oxide. The hotplate was turned on and the silver oxide was slowly heated. The temperature at which a chemical reaction, if any, occurred was observed and recorded.

The data obtained according to this test procedure are illustrated in Table 1, below. Diglyme and MMA did not react with silver oxide at the maximum temperature of the test, 120° C., which is 60° C. above the emergency shutdown maximum temperature. (The maximum temperature of the test was selected as the temperature at which the pressurized electrolyte boils.)

A number of materials reacted at about 23° C. above the emergency shutdown temperature of 60° C. The ethylene glycol standard material reacted at 1° C. above the emergency shutdown maximum, indicating that ethylene glycol will react under emergency shutdown conditions.

TABLE 1

| AgO Cathode Open Circuit Test Data (Example 1) | | | |
|---|---|---|---|
| | Temperature, °C. | | During |
| Test Liquid | First sign of reaction | Conversion AgO→Ag | Conversion |
| Ethylene Glycol | 61 | 67 | 120 |
| Carbowax 200-PEG 200 (Polyethylene Glycol) | 84 | 98 | 136 |
| Carbowax 350-MPEG 350 (Methoxypolyethylene Glycol) | 82 | 95 | 113 |
| Carbowax 550-MPEG 550 (Methoxypolyethylene Glycol) | 85 | 103 | 170 |
| Polypropylene Glycol-PPG 450 | 104 | 104 | 133 |
| Propylene Glycol | 81 | 81 | 98 |
| 2-(2-Methoxyethoxy) Ethanol | 68 | 84 | 140 |
| 2-Methoxyethyl Ether (Diglyme) | no reaction occurred | when heated to 120° C. | — |

TABLE 1-continued

AgO Cathode Open Circuit Test Data
(Example 1)

| Test Liquid | Temperature, °C. | | During |
|---|---|---|---|
| | First sign of reaction | Conversion AgO→Ag | Conversion |
| Methyl Methacrylate (MMA) | no reaction occurred | when heated to 120° C. | — |
| 5.1 M LiOH (aq.) (saturated) | no reaction occurred | when heated to 120° C. | |

Example 2—Lithium Anode Open Circuit Voltage Test

A three-quarter inch diameter piece of lithium was placed in a beaker containing the test fluid. Room temperature hydrogen gas production rate, if any, was semiquantitatively noted on a scale from 0 to 1.

The resulting data is set forth in Table 2, below. In summary, it was noted that ethylene glycol, 4.3 molar LiOH, saturated LiOH, and PEG 200 had relatively high gassing rates, although the rates for PEG 200 and 5.1 molar LiOH are acceptably low. Several materials, such as diglyme and MPEG 350, exhibited no reaction with lithium.

TABLE 2

Lithium Anode Open Circuit Test Data
(Example 2)

| | Gassing Rate |
|---|---|
| Ethylene Glycol | 1 |
| PEG 200 | .5 |
| MPEG 350 | 0 |
| MPEG 550 | 0 |
| PPG 450 | 0 |
| Diglyme | 0 |
| 4.3 M LiOH (aq.) | 1 |
| 5.1 M LiOH (aq.) | .5 |

Example 3—Electrolyte Miscibility Test

Miscibility studies were conducted between the test fluid and an electrolyte of approximately 4.3 molar lithium hydroxide in aqueous solution. The liquids were mixed at volume proportions of 25:75, 50:50 and 75:25, stirred and allowed to settle, and the miscibilities qualitatively noted.

TABLE 3

Miscibility Test Data
(Example 3)

| | 4.3 M LiOH | | |
|---|---|---|---|
| Chemical | 25% by volume | 50% by volume | 75% by volume |
| Ethylene Glycol | 1 liquid phase | 1 liquid phase | 1 liquid phase |
| Carbowax 200- PEG 200 (Polyethylene Glycol) | 1 liquid phase | 1 liquid phase | 1 liquid phase |
| Carbowax 350- MPEG 350 (Methoxypolyethylene Glycol) | 1 liquid phase | 1 liquid phase | 1 liquid phase |
| Carbowax 550- MPEG 550 (Methoxypolyethylene Glycol) | 1 liquid phase 1 solid phase | 1 liquid phase 1 solid phase | 1 liquid phase 1 solid phase |
| Poly (Propylene Glycol)-PPG 450 | 2 liquid phases | 2 liquid phases | 2 liquid phases |
| Propylene Glycol | 1 liquid phase | 1 liquid phase | 1 liquid phase |
| 2-(2-Methoxyethoxy) Ethanol | 1 liquid phase 1 solid | 2 liquid phases 1 solid | 2 liquid phases 1 solid |
| 2-Methoxyethyl Ether (Diglyme) | 2 liquid phases 1 solid phase | 2 liquid phases 1 solid phase | 2 liquid phases 1 solid phase |
| Methyl Methacrylate (MMA) | 2 liquid phases | 2 liquid phases | 2 liquid phases |

Three sets of conditions were observed in the test, i.e, (a) a single liquid phase, (b) two liquid phases, and (c) two liquid phases plus a solid LiOH precipitate suspension. The first condition, a single liquid phase, is a preferred embodiment. As seen in Table 3, above, the ethylene glycol, PEG 200 and MPEG 350 all exhibited single liquid phases. However, as noted above, ethylene glycol is an unsuitable shutdown liquid due to its unacceptably high rate of reaction with lithium.

Each of the materials identified in Table 3, with the exception of ethylene glycol and methyl methacrylate, are suitable liquids for use in the invention. With the exception of ethylene glycol and methyl methacrylate, the designation of "two liquid phases" in the Table means that a water-rich phase and an organic-rich phase were observed, but that the water-rich phase contained sufficient (i.e., more than 5 wt. %) organic polymer to passivate the electrochemical reaction.

Summarizing the results of the foregoing Examples, it is noted that PEG 200, with two reactive hydrogen atoms, exhibits a relatively high lithium reactivity rate, a moderate rate of reactivity with a silver oxide cathode, and complete miscibility with electrolyte. In the case of MPEG 350, where one of the hydrogen atoms is replaced by an inactive ether linkage, the lithium reactivity drops to zero and the silver oxide reactivity and miscibility remain unchanged. If both active hydrogens are replaced with ether linkages, no chemical reactivity with either the anode or the cathode is exhibited, but complete miscibility is lost. However, such molecules are generally sufficiently miscible with aqueous electrolytes to accomplish the objectives of the invention.

MPEG 350 is the preferred liquid of those tested in the foregoing Examples.

Those skilled in the art will recognize from the foregoing disclosure that the shutdown liquid of the invention may be utilized as a means for controlling the rate of reaction of a cell, in addition to completely passivating or shutting down a cell. In order to control the rate of electrochemical production of a cell, therefore, the shutdown liquid is circulated at a controlled concentration to the reaction space defined between the cathode and anode of the cell, with the reaction rate varying inversely with respect to the concentration of the selected fluid in contact with the components of the cell. This concentration is a function of the concentration of polymer in the shutdown liquid in the supply, the rate of flow of the supplied liquid, and the rate of introduction, if any, of additional aqueous electrolyte or make-up water to the cell.

The rate of reaction thus can be readily empirically controlled by those skilled in the art.

The foregoing detailed description is given for clearness of understanding only, and no unnecessary limitations should be inferred therefrom, as modifications within the scope of the invention will be obvious to those skilled in the art.

I claim:

1. An electrochemical cell comprising a reactive metal anode, a cathode spaced from said anode to define a reaction space, an aqueous alkaline electrolyte with which said anode and said cathode are in contact during operation of said cell, a supply of a shutdown liquid, and means adapted to introduce said liquid to said cell to at least partially displace said electrolyte and at least partially passivate said cell, said liquid comprising an ethylenically saturated organic polymer having a molecular weight of about 100 to 1,000 Daltons, said liquid being at least partially miscible with said electrolyte and containing a plurality of ether linkages, wherein the atomic ratio of carbon present in the polymer to the oxygen present in the ether linkages is in the range of about 1:1 to 5:1, said polymer being substantially chemically inert with respect to said anode, said cathode and said electrolyte.

2. The cell of claim 1 wherein said anode is an alkali metal.

3. The cell of claim 2 wherein said anode comprises lithium.

4. The cell of claim 1 wherein said shutdown liquid is selected from the group consisting of tertiary alcohols and linear, branched and cyclic polyethers.

5. The cell of claim 4 wherein said shutdown liquid comprises a methoxylated polyethylene glycol having a molecular weight of about 350 to 550 Daltons.

6. The cell of claim 1 wherein said shutdown liquid comprises a polypropylene glycol having a molecular weight of about 400 to 500 Daltons.

7. The cell of claim 1 wherein said shutdown liquid is stored at a depressed temperature relative to that of said electrolyte.

8. The cell of claim 7 wherein said shutdown liquid is stored at a temperature which is lower than the activation temperature of said anode.

9. The cell of claim 8 wherein said shutdown liquid is stored at a temperature below about 0° C.

10. The cell of claim 1 wherein said cathode comprises silver oxide.

11. The cell of claim 1 wherein said cathode is an air cathode.

12. The cell of claim 1 wherein said polymer comprises at least about 25 volume percent of said shutdown liquid.

13. A method of at least partially passivating an electrochemical cell which comprises a reactive metal anode, a cathode spaced from said anode to define a reaction space, and an aqueous electrolyte in which said anode and said cathode are in contact during operation of the cell, said method comprising the step of introducing to said reaction space in an amount sufficient to at least partially passivate said cell a shutdown liquid comprising an ethylenically saturated organic polymer having a molecular weight of about 100 to 1,000 Daltons, said liquid being at least partially miscible with said electrolyte and containing a plurality of ether linkages, wherein the atomic ratio of carbon present in the polymer to the oxygen present in the ether linkages is in the range of about 1:1 to 5:1, said polymer being substantially chemically inert with respect to said anode, said cathode and said electrolyte.

14. The method of claim 13 wherein said anode is an alkali metal.

15. The method of claim 14 wherein said anode comprises lithium.

16. The method of claim 13 wherein said shutdown liquid is selected from the group consisting of alcohols and linear, branched and cyclic polyethers.

17. The method of claim 16 wherein said shutdown liquid comprises a methoxylated polyethylene glycol having a molecular weight of about 350 to 550 Daltons.

18. The method of claim 16 wherein said shutdown liquid comprises a polypropylene glycol having a molecular weight of about 400 to 500 Daltons.

19. The method of claim 13 wherein said shutdown liquid is stored at a depressed temperature relative to that of said electrolyte.

20. The method of claim 19 wherein said shutdown liquid is stored at a temperature which is lower than the activation temperature of said anode.

21. The method of claim 20 wherein said shutdown liquid is stored at a temperature below about 0° C.

22. The method of claim 13 wherein said cathode comprises silver oxide.

23. The method of claim 13 wherein said cathode is an air cathode.

24. The method of claim 13 wherein said polymer comprises at least about 25 volume percent of said shutdown liquid.

* * * * *